(12) United States Patent
Johnston et al.

(10) Patent No.: US 9,772,842 B2
(45) Date of Patent: Sep. 26, 2017

(54) MANAGING CHANGE SETS

(71) Applicant: International Business Machines Corporation, Armonk, NY (US)

(72) Inventors: Gary M. Johnston, Research Triangle Park, NC (US); Adam R. Neal, Kanata (CA); Vishwanath Ramaswamy, Kanata (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/005,175

(22) Filed: Jan. 25, 2016

(65) Prior Publication Data
US 2017/0212753 A1 Jul. 27, 2017

(51) Int. Cl.
*G06F 9/45* (2006.01)
*G06F 9/44* (2006.01)
*G06F 9/445* (2006.01)

(52) U.S. Cl.
CPC . *G06F 8/71* (2013.01); *G06F 8/65* (2013.01)

(58) Field of Classification Search
None
See application file for complete search history.

(56) References Cited

U.S. PATENT DOCUMENTS

| | | | |
|---|---|---|---|
| 7,908,601 B2 | 3/2011 | Clemm et al. | |
| 8,359,571 B2 * | 1/2013 | Clemm | G06F 8/71 717/120 |
| 9,021,471 B2 * | 4/2015 | DeLuca | G06F 8/71 717/120 |
| 9,141,378 B2 * | 9/2015 | Fox | G06F 8/70 |
| 2003/0005093 A1 * | 1/2003 | Deboer | G06F 8/71 709/220 |
| 2003/0084425 A1 * | 5/2003 | Glaser | G06F 8/433 717/110 |
| 2003/0120678 A1 * | 6/2003 | Hill | G06F 8/71 |
| 2003/0121024 A1 * | 6/2003 | Hill | G06F 8/71 717/107 |
| 2005/0235012 A1 * | 10/2005 | Harry | G06F 8/71 |
| 2006/0010425 A1 * | 1/2006 | Willadsen | G06F 8/71 717/120 |
| 2008/0120591 A1 | 5/2008 | Clemm et al. | |
| 2010/0131940 A1 * | 5/2010 | Jazdzewski | G06F 8/71 717/170 |
| 2013/0007709 A1 | 1/2013 | Fan et al. | |
| 2013/0326480 A1 * | 12/2013 | Clemm | G06F 8/71 717/122 |
| 2014/0215436 A1 * | 7/2014 | DeLuca | G06F 8/71 717/121 |
| 2015/0106790 A1 * | 4/2015 | Bigwood | G06F 11/3624 717/127 |

OTHER PUBLICATIONS

Disclosed Anoymously, "Managing Change Histories", ip.com, IP.com No. 000225062; Jan. 23, 2013; 5 pages.

* cited by examiner

*Primary Examiner* — Matthew Brophy
(74) *Attorney, Agent, or Firm* — Cantor Colburn LLP

(57) ABSTRACT

Aspects include managing change sets in a configuration management system. Delivery of the change sets is initiated. A determination is made as to which of the change sets are applicable for delivery. A request to deliver specific change sets of the change sets applicable for delivery, is received from a user and in response to receiving the request, a target change for delivery is created.

17 Claims, 12 Drawing Sheets

FIG. 7

Steam 700
    id: String  702
    name: String 704
    description: String 706
    parent: Configuration 708
    creationTime: Timestamp 710
    creator: Contributor 712

FIG. 8

ChangeSet  800
    id: String  802
    state: ChangeSetState 804
    name: String  806
    parentStream: Configuration 808
    dependents: ChangeSet  810
    mergedFrom: ChangeSet  812
    creationTime: Timestamp 814
    creator: Contributor 816
    dependenciesComputed: Boolean 818

FIG. 9

VersionMapping 900
    id: String   902
    stream: Stream  904
    concept: String  906
    version: String   908
    current: Boolean  910
    deleted: Boolean  912
    creationTime: Timestamp 914
    changeSet: ChangeSet 916
    creator: Contributor 918
    previousVersion: VersionMapping 920

FIG. 10

DeliveredChange  1000
        creationTime: Timestamp 1002
        targetStream: Stream 1004
        changeSet: ChangeSet 1006

| Creation Time | 1102 | Target Stream | 1104 | Change Set | 1106 |
|---|---|---|---|---|---|
| <time stamp 1> | 1108 | Stream 2 | 1110 | CS1 | 1112 |

| 1202 | 1204 | 1206 | 1208 | 1210 | 1212 | 1214 | 1216 | 1218 |
|------|------|------|------|------|------|------|------|------|
| ID | State | Name | Parent Stream | dependents | Merged from | Creation time | creator | Dependencies computed |
| CS1 | Committed | CS1 | Stream 1 | <null> | <null> | <timestamp 1> | Bob | true |
| CS2 | Committed | CS2 | Stream 1 | CS1 | <null> | <timestamp 2> | Lisa | true |
| CS3 | Committed | CS3 | Stream 2 | CS1 | <null> | <timestamp 3> | Adam | true |
| CS4 | Committed | CS4 | Stream 2 | CS2 | <null> | <timestamp 4> | Adam | true |

| 1302 | 1304 | 1306 | 1308 | 1310 | 1312 | 1314 | 1316 | 1318 | 1320 |
|------|------|------|------|------|------|------|------|------|------|
| ID | Stream | Concept | Version | Current | Deleted | Creation time | Change set | creator | Previous version |
| VM1 | Stream 1 | foo | 1 | False | False | <timestamp 1> | CS1 | Bob | <null> |
| VM2 | Stream 1 | bar | 1 | False | False | <timestamp 1> | CS1 | Bob | <null> |
| VM4 | Stream 1 | bar | 2 | true | False | <timestamp 2> | CS2 | Lisa | VM2 |
| VM3 | Stream 1 | foo | 2 | true | False | <timestamp 2> | CS2 | Lisa | VM1 |
| VM5 | Stream 2 | foo | 3 | False | False | <timestamp 3> | CS3 | Frank | VM1 |
| VM6 | Stream 2 | bar | 3 | False | False | <timestamp 3> | CS3 | Frank | VM2 |
| VM7 | Stream 2 | foo | 4 | true | False | <timestamp 4> | CS4 | Adam | VM5 |
| VM8 | Stream 2 | baz | 1 | true | False | <timestamp 4> | CS4 | Adam | <null> |

| 1402 | 1404 | 1406 | 1408 | 1410 | 1412 | 1414 | 1416 | 1418 | |
|---|---|---|---|---|---|---|---|---|---|
| ID | State | Name | Parent Stream | dependents | Merged from | Creation time | creator | Dependencies computed | |
| CS5 | Committed | CS5 | Stream 1 | <empty> | CS3, CS4 | <timestamp 5> | Adam Neal | false | 1420 |

| 1502 | 1504 | 1506 | 1508 | 1510 | 1512 | 1514 | 1516 | 1518 | 1520 |
|---|---|---|---|---|---|---|---|---|---|
| ID | Stream | Concept | Version | Current | Deleted | Creation time | Change set | creator | Previous version |
| VM1 | Stream 1 | foo | 1 | False | False | <timestamp 1> | CS1 | Bob | <null> |
| VM2 | Stream 1 | bar | 1 | False | False | <timestamp 1> | CS1 | Bob | <null> |
| VM3 | Stream 1 | foo | 2 | False | False | <timestamp 2> | CS2 | Lisa | VM2 |
| VM4 | Stream 1 | bar | 2 | False | False | <timestamp 2> | CS2 | Lisa | VM1 |
| VM5 | Stream 2 | foo | 3 | False | False | <timestamp 3> | CS3 | Frank | VM1 |
| VM6 | Stream 2 | bar | 3 | False | False | <timestamp 3> | CS3 | Frank | VM2 |
| VM7 | Stream 2 | foo | 4 | true | False | <timestamp 4> | CS4 | Adam | VM5 |
| VM8 | Stream 2 | baz | 1 | true | False | <timestamp 4> | CS4 | Adam | <null> |
| VM9 | Stream 1 | foo | 5 | true | False | <timestamp 5> | CS5 | Adam | VM3 |
| VM10 | Stream 1 | bar | 5 | true | False | <timestamp 5> | CS5 | Adam | VM4 |
| VM11 | Stream 1 | baz | 1 | true | False | <timestamp 5> | CS5 | Adam | <null> |

|  | 1602 | 1604 | 1606 | 1608 | 1610 | 1612 | 1614 | 1616 | 1618 |
|---|---|---|---|---|---|---|---|---|---|
|  | ID | State | Name | Parent Stream | dependents | Merged from | Creation time | creator | Dependencies computed |
| 1620 | CS5 | Committed | CS5 | Stream 1 | CS2 1624 | CS3, CS4 | \<timestamp 5\> | Adam Neal | true 1626 |

|  | Creation Time | 1702 | Target Stream | 1704 | Change Set | 1706 |
|---|---|---|---|---|---|---|
|  | \<time stamp 1\> | 1708 | Stream 2 | 1710 | CS1 | 1712 |
| 1726 | \<time stamp 5\> | 1714 | Stream 1 | 1716 | CS3 | 1718 |
| 1728 | \<time stamp 5\> | 1720 | Stream 1 | 1722 | CS4 | 1724 |

1700

MANAGING CHANGE SETS

BACKGROUND

The present invention relates generally to source code management systems in data processing systems, and more specifically, to an enhanced configuration management system for managing change sets used in the data processing systems.

SUMMARY

According to embodiments, a method, system, and computer program product for managing change sets in a configuration management system. A method includes initiating delivery of the change sets. A determination is made as to which of the change sets are applicable for delivery. A request to deliver specific change sets of the change sets applicable for delivery, is received from a user and in response to receiving the request, a target change for delivery is created.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

FIG. 7 is a tabular representation of data structure of a stream artifact in accordance with one embodiment of the disclosure;

FIG. 8 is a tabular representation of data structure of a change set artifact in accordance with one embodiment of the disclosure;

FIG. 9 is a tabular representation of data structure of a version mapping artifact in accordance with one embodiment of the disclosure;

FIG. 10 is a tabular representation of data structure of a delivered change artifact in accordance with one embodiment of the disclosure;

FIG. 11 is a tabular representation of data structure of a delivered change table artifact in accordance with one embodiment of the disclosure;

FIG. 12 is a tabular representation of data structure of a change set table artifact in accordance with one embodiment of the disclosure;

FIG. 13 is a tabular representation of data structure of a version mapping table artifact in accordance with one embodiment of the disclosure;

FIG. 14 is a tabular representation of data structure of a change set table artifact in accordance with one embodiment of the disclosure;

FIG. 15 is a tabular representation of data structure of a version mapping table artifact in accordance with one embodiment of the disclosure;

FIG. 16 is a tabular representation of data structure of a change set table artifact in accordance with one embodiment of the disclosure;

FIG. 17 is a tabular representation of data structure of a delivered change table artifact in accordance with one embodiment of the disclosure;

DETAILED DESCRIPTION

Figure 1:
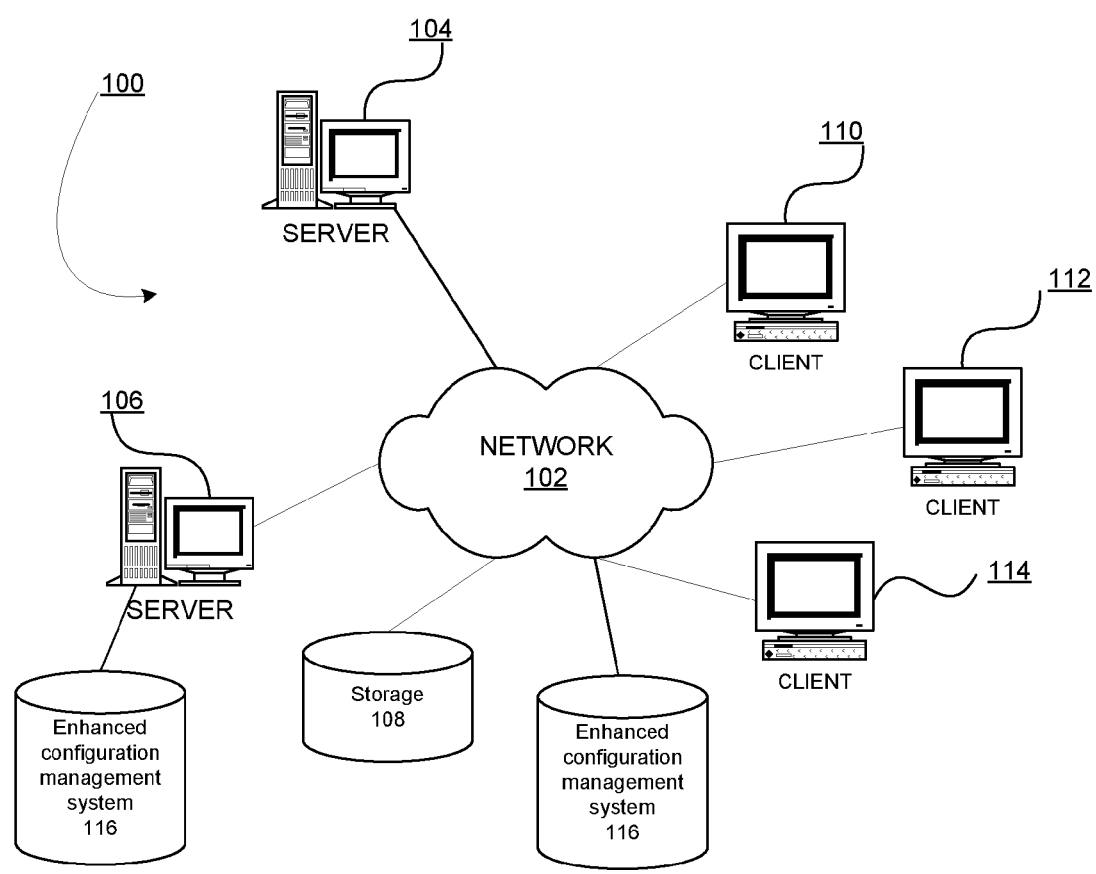
FIG. 1 is a block diagram of an exemplary network data processing system operable for various embodiments of the disclosure.

A key challenge of configuration management systems is to provide a scalable solution that will provide unambiguous change set and version history, while retaining information about merges so that customers can audit their respective systems to understand exactly how a current state was established. An ability to audit where change sets were either delivered to or from is desirable for systems of customers who have very strict rules about the process for which changes are permitted to propagate through their respective systems. It is also desirable for a system to be able to determine which change sets have been delivered into which streams without duplicating content.

Embodiments described herein can provide unambiguous change set history and version history while at the same time minimizing duplicate data. In addition, embodiments can provide auditable information about the origins of change sets.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and ten of item C; four of item B and seven of item C; and other suitable combinations.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
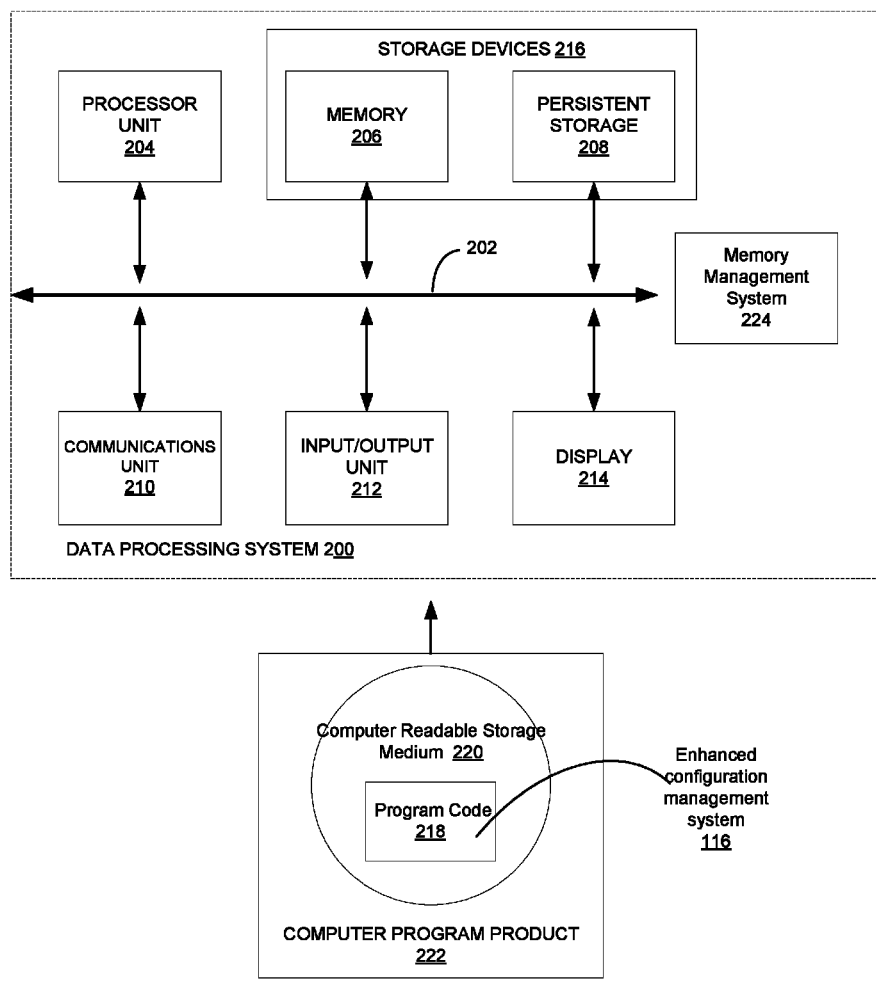
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. Enhanced configuration management system 116 may be downloadable, in the form of code suitable execution when deployed on any number of server 104 or server 106. Server 106 is also shown as having enhanced configuration management system 116 implemented at the location as an executable embodiment of the enhanced configuration management system. Enhanced configuration management system 116 is an embodiment of the disclosed system for managing change sets in an enhanced configuration management system in a data processing system, such as server 106.

In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media or a computer readable data storage device. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

Enhanced configuration management system 224 may be downloadable, in the form of program code 218, suitable for execution when deployed on any number of data processing systems including data processing system 200. Enhanced configuration management system 224 may also be in another embodiment as shown currently implemented on data processing system 200. Data processing system 200 is shown as having enhanced configuration management system 224 implemented at the location as an executable embodiment of the disclosed system for managing change sets in an enhanced configuration management system in a data processing system, such as data processing system 200.

Using data processing system 200 of FIG. 2 as an example, an apparatus for parallel processing of files on a distributed file system is presented. The apparatus comprises a communications fabric 202; memory 206 connected to the communications fabric, wherein the memory contains computer executable program code 218; communications unit 210 connected to the communications fabric; input/output unit 212 connected to the communications fabric; display 214 connected to the communications fabric; and processor unit 204 connected to the communications fabric.

Processor unit 204 executes the computer executable program code to direct the apparatus, in response to a request to process as input a file stored on a distributed file system, to partition the file by a single coordinator of data scanning and processing services into a set of predetermined sized blocks. Processor unit 204 executes the computer executable program code to direct the apparatus to assign one or more blocks in the set of predetermined sized blocks by the single coordinator to a reader in a set of readers and to record block assignments by the coordinator to a control table accessible to all readers.

Processor unit 204 further executes the computer executable program code to direct the apparatus to access the control table by the set of readers to search the control table for a row currently assigned to a respective reader and in response to locating the row currently assigned to the respective reader, to change a state of the row to "in progress", and to update a timestamp associated with the row in the control table by the respective reader. Further in response to a determination all blocks currently assigned to the respective reader are exhausted, processor unit 204 executes the computer executable program code to direct the apparatus to scan the control table for a set of the blocks available, by the reader and to dynamically re-assign an available block by the reader from another owning reader to the respective reader using a set of predefined heuristics and change the row owner to the respective reader. In response to a determination no rows are available, processor unit 204 further executes the computer executable program code to direct the apparatus to complete processing by the respective reader and to return an end of file indication to the single coordinator.

With further reference to components of FIG. 2, the components may be used to implement one embodiment of managing change sets in a configuration management system. Processor unit 204 executes program code 218 representative of enhanced configuration system 116 of FIG. 1 and initiates a delivery of the change sets. Processor unit 204 further executes program code 218 to determine which of the change sets are applicable for delivery. Processor unit 204 further executes program code 218 receives a request to deliver specific change sets of the change sets applicable for delivery, from a user using at least one of communications unit 210 or input/output unit 212 and in response to receiving the request, creates a target change for delivery.

Implementation of program code 218 representative of enhanced configuration system 116 of FIG. 1 transforms data processing system 200 into a special purpose computing system possessing capabilities beyond those of a generic data processing system absent the controlling procedures of program code 218.

Figure 3:
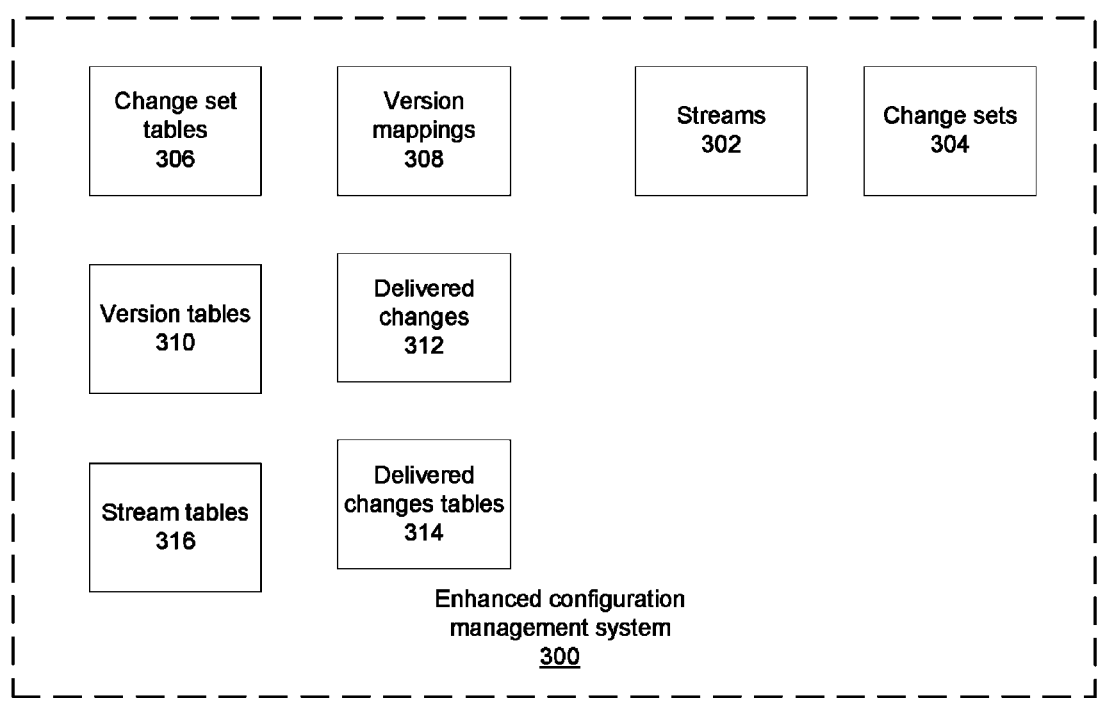
FIG. 3 is a block diagram representation of a enhanced configuration management system operable for various embodiments of the disclosure.

With reference now to FIG. 3, a block diagram of an enhanced configuration management system operable for various embodiments of the disclosure is presented. Enhanced configuration management system 300 provides a capability for managing change sets in a data processing system, such as data processing system 200 of FIG. 2.

Enhanced configuration management system 300 comprises a number of functional components which when implemented on a data processing system enhance the previous capabilities of the data processing system to provide additional capabilities for managing change sets in the data processing system. The example provided is only an example and is provided without limitation as to various equivalent combinations of functional components. The functional components depict may be implemented in one embodiment as a set of functional components and in another embodiment as combinations of functional components without departing from the overall disclosed functional capabilities.

Enhanced configuration management system 300 comprises functional components including artifacts of stream 302, change set 304, change set tables 306, version mapping 308, version mapping tables 310, delivered change 312, delivered changes tables 314 and stream tables 316. These particular artifacts will be described in further detail in the following sections through use of examples. In the following disclosure the tables as shown change set tables 306, version mapping tables 310, delivered changes tables 314 and stream tables 316 are simply to illustrate how to define the artifact. For example the Change Set Table is shown to illustrate where each row represents a change set artifact. An embodiment as described in the example is only one way in which one skilled in the art may achieve an implementation of an embodiment. The "tables" are but one form of data structure implemented to contain the information used in enhanced configuration management system 300, which otherwise also comprises the Change Sets, Version Mappings, Delivered Changes and Streams.

As previously stated a challenge for configuration management systems is to provide a scalable solution that provides unambiguous change set and version history, while retaining information about merges so that customers can audit their respective systems to understand exactly how a current state was established. An ability to audit where change sets were delivered to or from is also an important capability for systems which have strict rules regarding a process for which changes are permitted to propagate through the respective system. A system may also need a capability to determine which change sets have been delivered into which streams without duplicating content.

Figure 4:
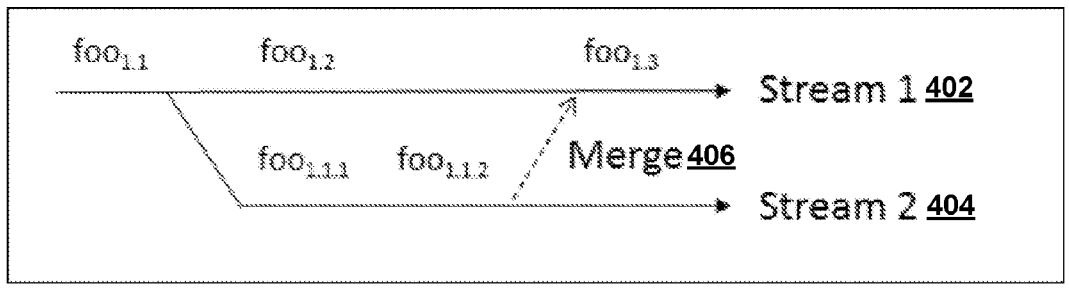
FIG. 4 is a block diagram of a branch and merge using a variation of a configuration management system in accordance with embodiments.

With reference to FIG. 4 a branch and merge example is shown using a concurrent versioning system (CVS) available in the market today as one variant of a version based configuration management system. CVS solves a typical problem of managing version changes by simply tracking revisions of a predetermined source file.

CVS type configuration management systems are based solely on version management. Every change to the predetermined source file results in new revisions being created. Branching (creating a stream) results in duplication of all artifacts from the source stream. Merging of streams is performed; as merge 406, in a simplistic way, in which a new version is created in a target stream that has new merged content. Referring to FIG. 4, with regard to Stream 1 402 knowledge that $foo_{1.3}$ is built on $foo_{1.2}$ is known; however any notion that $foo_{1.3}$ came from $foo_{1.1.2}$ is lost. Moreover, further deliveries from Stream 2 404 require a user to be aware of which versions are pushed into Stream 1 402 to ensure previously delivered versions are not re-merged.

CVS systems for source management provide an unambiguous version history of an artifact in a particular branch, but do not help users understand the origin of data in event of merges. The CVS systems also duplicate data for each branch raising scalability concerns in the long term. The CVS system has no concept of change sets, which means this particular strategy cannot reasonably be used to solve a problem where change set history needs to be tracked and change set deliveries need to be supported.

Figure 5:
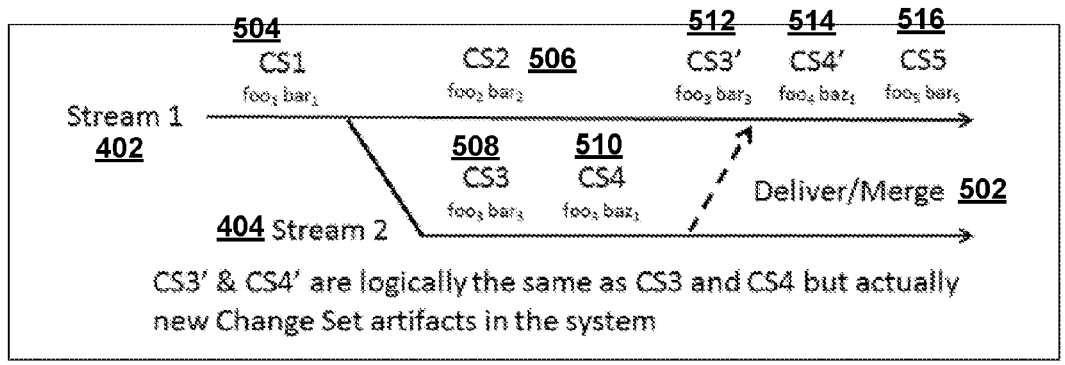
FIG. 5 is a block diagram of a branch and merge using an alternate variation of a configuration management system in accordance with embodiments.

With reference to FIG. 5, a version, variants and configurations (VVC) system is another type of source management system available in the market today. The VVC system does have a notion of change sets and attempts to organize multiple dependent file changes into a single change set. A delivery between Stream 1 402 and Stream 2 404 should only permit delivery of change sets that have not already been delivered and the system is required to show a version history of an artifact as well as change set history of an artifact in a particular Stream.

In FIG. 5, a user has created an initial version of foo and bar in change set CS1 504. A branch is created, shown as Stream 2 404, which does not duplicate data from Stream 1 402, rather the data is only implicitly included. A user then creates a change set CS2 506 in Stream 1 402 while another user creates change sets CS3 508 and CS4 510, in which all created change sets affect artifact foo. When change sets CS3 508 and CS4 510 are delivered from Stream 2 404 to Stream 1 402, in deliver/merge 502, the VVC system actually copies CS3 508 and CS4 510 into Stream 1 402, creating variations CS3' 512 and CS4' 512, enabling the system to have knowledge change sets CS3 508 and CS4 510 exist in Stream 1 402 and cannot be re-delivered. The system also creates change set CS5 516 to hold any merge results. This example provides a version history for foo in both Stream 1 402 and Stream 2 404, as well as a change set history for foo. However the version and change set histories are arguably correct. With regard to Stream 1 402, and looking back in time, the version history states foo version: 5, 4, 3, 2, and 1. This is actually incorrect, because $foo_3$ was based on $foo_1$, and $foo_1$ was actually based on $foo_4$ merged with $foo_2$. Change set history is also suspect, because change set CS3 512 was based on change set CS1 504 and not change set CS2 506 as the persisted data would imply. Tracking information in this type of system therefore leads the user to believe that change set CS3 512 was based on change set CS2 506 until a further detailed inspection is carried out.

The VVC system for configuration management accordingly provides somewhat ambiguous version and change set histories, duplicates data, and is still missing information regarding an origin of a change set (whether a change set was delivered rather than explicitly created by a user).

Other variations of source code management systems are available in which duplication of data on a merge does not occur, however these variations still append delivered change sets into a change set history providing a somewhat ambiguous view of the change set history at a glance, similar to the VVC system just discussed. In this case, change set CS3 512 would appear to be based on change set CS2 506. Further these variations of source code management system do not track information regarding and origin of the delivered change sets.

Figure 6:
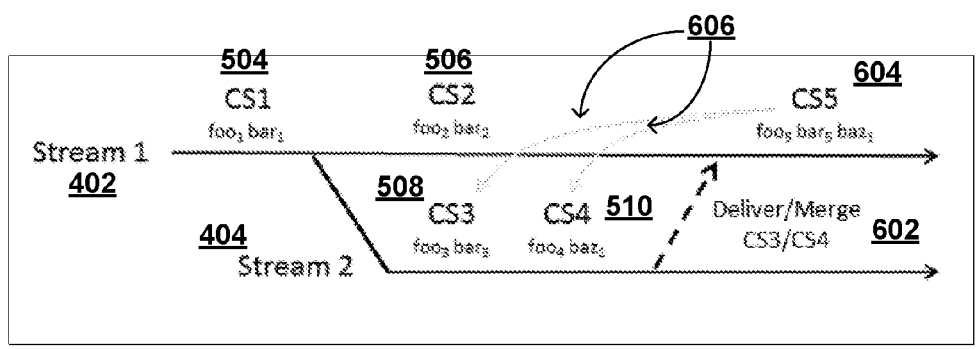
FIG. 6 is a block diagram of a change set delivery in accordance with one embodiment of the disclosure.

With reference to FIG. 6, in an embodiment of the current invention, delivery of change sets ultimately results in creation of a new change set in a target stream with mappings for resources that were added or changed as a result of the delivery. The new change set in the target stream also has back pointers, which are references to the change sets in a source stream that were delivered to the target stream. The embodiment therefore provides two logical types of change sets in the form of a local change set and a target change set. The user creates the local change set explicitly or implicitly by the system due to creating and/or modifying resources in a stream. A local change set is simply a change set that has no back pointers. A target change set is created as a result of delivering one or more change sets from one stream to another stream. A target change set has back pointers to the change sets in the source stream whose delivery resulted in its creation.

FIG. 6 shows the same example of change set delivery described previously. Change set CS1 504 was created with version 1 of artifact foo, and version 1 of artifact bar. At some point later Stream 2 404 branched from Stream 1 402. A user created change set CS2 506 in Stream 2 404 in parallel with another user creating change sets CS3 508 and CS4 510 in Stream 2 404. At a point later, the user wants to merge 602 the content of artifact foo back into Stream 1 402.

In this example of an embodiment of the current invention, a target change set CS5 604 is created which contains all relevant artifacts merged states (foo5, bar5. baz1), and also contains back pointers 606 to the change sets that were included in the delivery.

The presence of the metadata in the form of the back pointers 606 addresses requirements for scalability, change set history, version history and merge history. Scalability is provided in that the change sets are not copied from Stream 2 404 into Stream 1 402, rather which change sets were used in the delivery process are only referenced. Change set history is also provided in that change set history of CS5 604 enables the user to have knowledge that history branches at change sets CS2 506 and CS4 510, which is more than a VVC solution, previously described would provide. Extrapolating the version from the change set history provides a version history to readily identify that version 5 of foo was created by merging $foo_2$ and $foo_4$. Because there is no duplication and a reference to change set CS4 510 is followed, the version history of $foo_4$ to be $foo_3$ can be traced, converging at $foo_1$ with a version history path followed in Stream 1 402. Merge history is also provided because change sets CS3 508 and CS4 510 have knowledge of the stream in which they were created, and explicitly exist in Stream 2 404, and change set CS5 604 has a pointer to change sets CS3 508 and CS4 510, therefore an indication that the merge 602 came from delivering specific change sets from Stream 2 404 can be provided to an end user.

A specialized data structure, in this example, in a form of a database table is provided in an embodiment of the current invention for helping track the logical change sets that exist in individual streams. For example, when stream 1 402 is branched into Stream 2 404, knowledge that change set CS1 504 is logically already in Stream 2 404 is required even though there is no explicit representation for change set CS1 504 against a specific instance of Stream 2 404. When a change set is delivered from one stream to another stream, knowledge that at a later time that change set is no longer available for delivery again is required, and conversely the delivered change set is not applicable to be pushed back into the original source stream. An embodiment of the current invention accordingly provides a capability to branch and merge changes between streams without duplicating content in the streams, to quickly respond to questions about which change sets are logically in a given stream, to minimize time taken during the delivery process by enabling the system to update a current state of change sets in the system asynchronously, and to handle complex patterns of delivery through multiple streams preventing potential erroneous cyclical deliveries.

To support this delivery and change management system in an embodiment of the current invention a set of artifacts is defined. Each of these artifacts can be realized as a database table, in which attributes of the artifact are columns in the table. Each row therefore constitutes an instance of the respective artifact. Other forms of data structures may be used without limitation, however database tables are used in discussion of the artifacts in an embodiment of the invention presented herewith.

With reference to FIG. 7, an artifact of a Stream 700 with a set of properties is defined. An id 702 (required) is a unique identifier of a configuration, which could be one of an id or a guid; for example, the Stream 1, as previously shown. A name 704 is (optional) and is a user-defined name that identifies the configuration. A description 706 is also (optional) and is a user-defined description for the configuration. A parent 708 (optional) is a reference to the configuration from which this configuration was made (a baseline points to a stream it is of, and a stream points to the baseline from which it branched. Note parent is optional because there may be a root stream that has no parent). Creation time 710 (required) is a time stamp of when the baseline or stream was created. Creator 712 (required) is a name or identifier of a user who created the stream currently being defined. While valid to require streams to have parent baselines, in some cases there may be a root baseline that does not have parent stream. Embodiments of the disclosure will work in either case, and therefore a stream may not have a parent when the stream is a root (or top most) stream.

With reference to FIG. 8, an artifact of a ChangeSet 800 with a set of properties is defined. An id 802 (required) is a unique identifier for the change set, which could be an id or a quid; for example, CS3 as previously shown. A state 804 (required) provides an indication as to whether the change set is mutable, immutable or committed. A name 806 (optional) is a user-defined name that describes the change set. A parentStream (required) is a reference to the stream in which this change set was explicitly created. A dependents 810 (optional, set) is a set of merge gap dependent change sets. When this change set, which contains dependents 810, is delivered, these dependents must also be delivered if they are not already in the target. A merge gap occurs when a change set which is newer is applied before an older change set, causing parts to be missing (for example, missing dependent changes). A mergedFrom 812 (optional, set), when populated indicates this change set was the result of a delivery from another stream. The contents of this set identify those change sets, which were involved in the delivery. A creationTime 814 (required) is a time stamp that indicates when the change set was created. A creator (required) is a name of the user who created the change set. A dependencies Computed 818 (required) is a flag, which indicates whether the dependents 810 have been calculated yet. This information enables processing of potentially expensive calculations asynchronously from the delivery process itself thereby allowing a speedier delivery.

With reference to FIG. 9, an artifact of a VersionMapping 900 with a set of properties is defined. The artifact defines an id 902 (required) as a unique identifier for this version mapping. A stream 904 (required) is the Stream associated with this particular version mapping artifact. A concept 906 (required) is a concept identifier for the version mapping, for example, foo. A version 908 (required) is a version identifier, for example, a numeric reference of 5, for fifth version. A current 910 (required) indicates whether this version mapping is a current version mapping of the given concept in the stream. A deleted 912 (required) indicates whether this version mapping has been soft deleted. A creationTime 914 (required) is a time stamp of when the version mapping was created. A changeSet 916 (required) is a reference to the change set in which this version mapping was created. A creator 918 (required) is the user who created this version mapping. A previous Version 920 (optional) is a reference to a last version mapping in the stream for the same concept.

With reference to FIG. 10, because change sets are not actually duplicated in the streams to which they are delivered, there is a need to define another artifact, which, in the current example, can be realized as a database table, that will assist in calculations and keep the system performing fast while determining what change sets are available for delivery. An artifact of a DeliveredChange 1000 with a set of properties is defined. The artifact defines creationTime 1002 (required) as the timestamp of the delivery when this change set has been logically delivered to a given stream. A targetStream 1004 (required) is the stream in which the given change set has been logically delivered. A changeSet 1006 (required) is a reference to the change set that has been delivered.

The previous example in FIG. 6 will be referred to in more detail to explain how the strategy of change set delivery works in an embodiment. With reference to FIG. 11, it is important to note that DeliveredChange table 1100 that tracks logically delivered change sets is also populated on branch operations. Therefore when Stream 2 404 is first created, DeliveredChange table 1100 will appear as shown. A heading row includes column headings of Creation Time 1102, having a value of <timestamp 1> 1108, Target Stream 1104, having a value of Stream 2 1110 and Change Set 1106, having a value of CS1 1112.

This is required as CS1 504 and its contents, in an embodiment, are implicitly inherited into Stream 2 404, meaning it is not valid to consider CS1 504 as deliverable into Stream 2 404. Therefore the change sets of the stream being branched must be added, up to a point where the stream is being branched, into the DeliveredChange table 1100 which indicates CS1 504 is logically part of Stream 2 404.

With reference now to FIG. 12, assuming other change sets are created as per FIG. 6 and a focus is placed on the delivery aspect of CS3 508 and CS4 510 into Stream 1 402. The state of change set table 1200 at the point the delivery will take place is shown. The heading row of change set table 1200 comprises ID 1202, State 1204, Name 1206, Parent Stream 1208, Dependents 1210, Merged from 1212, Creation time 1214, Creator 1216 and Dependencies computed 1218. Row 1220 indicates, among the various entries, a status of CS1 504 as being Committed, having no dependents, being created by Bob and dependencies having been computed.

With reference to FIG. 13 a state of the version table is presented with regard to the same example of FIG. 12. The heading row of the version table 1300 comprises ID 1302, Stream 1304, Concept 1306, Version 1308, Current 1310, Deleted 1312, Creation time 1314, Change set 1316, Creator 1318 and Previous version 1320. Row 1322 indicates, among the various entries, the ID is VM1 and applies to Stream 1 with a concept of foo in a first version and is also associated with CS1. Bob was the creator and there is no previous version.

Further using the same example, when a delivery is first initiated an embodiment of the invention determines which change sets are available for delivery from Stream 1 to Stream 2. This determination is made by 1) ensuring all asynchronous tasks for updating the DeliveredChanges table and the change set dependencies are complete and 2) recursively querying the ChangeSet table to find all change sets against the source stream (Stream 2) and a parent of that stream (Stream 1) to determine the set of outgoing change sets from the source stream. A representative query to find change sets may be a query such as: SELECT id FROM ChangeSet where stream=stream 2, and for each parent stream in the hierarchy; SELECT id FROM ChangeSet where stream=<—parent—e.g. stream 1> and creationTime <=<creation time of the branch—e.g. stream 2>. A result achieved would be {CS4, CS3, CS1}.

Then recursively querying the ChangeSet table is repeated for the target stream to determine the set of incoming change sets for the source stream, to provide a result of {CS2, CS1}. A query is performed of the DeliveredChange table for the target and source streams to find all logical change sets already existing in the respective stream. A representative query to find change sets in the target stream may be a query such as: SELECT changeSet from DeliveredChange where targetStream=stream 1.

All duplicates found between the logical change sets in the target stream, which is an empty set in this example, and the set of outgoing change sets from the source stream {CS4, CS3, CS1} are removed from the set of outgoing change sets from the source stream. All duplicates found between the incoming change sets to the source stream {CS2, CS1} and the outgoing set of change sets from the source stream {CS4, CS3, CS1} are removed from the outgoing set of change sets from the source stream. The process is then repeated to refine the set of incoming change sets {CS2, CS1} by removing all duplicates found in the set of outgoing change sets from the source {CS4, CS3, CS1} or any logical change sets found in the source {CS1}. After the removal of duplicates, the incoming set of change sets to the source stream comprises {CS2} and the set of outgoing change sets from the source stream comprises {CS3, CS4}. Removal enables the embodiment to have knowledge that CS3 and CS4 can be delivered into the target stream, stream 1, wherein CS2 is considered as incoming from Stream 1 to Stream 2.

With reference to FIG. 14, assume the user chooses to deliver CS3 508 and CS4 510 to stream 2, as per FIG. 6. The continuation of the example does not presume to discuss how final versions of the artifacts are determined, because this is considered deliver/merge user interface and out of scope. How a change set becomes persistent once the final versions have been determined is explained. Assume a new database transaction is started and a new change set is created in the context of Stream 1, and given an id of CS5. ChangeSet table 1400 is an example of what a row in a database table might look like for the ChangeSet table. The heading row of ChangeSet table 1400 comprises the same entries as those of previous ChangeSet table 1200 of FIG. 12. Row 1402 indicates, among the various entries, a status of CS5 604 as being Committed; having no dependents; being merged from two change sets of CS3, 508 and CS4 510 at a time of <timestamp 5>; created by Adam Neal and dependencies have not been computed.

With reference to FIG. 15, new version mappings are created for foo, bar and baz are created in the context of Stream 1. As part of creating the version mapping, the embodiment looks at Stream 1 to find the current versions of foo, bar and baz, and will set those version mappings as no longer current, and then set them as previous version mappings for the new version mappings needed in CS5 604. The Version mapping table when CS5 604 is created would look Version mapping table 1500. The heading row of Version mapping table 1500 has the same entries as the heading row of Version mapping table 1300 of FIG. 13. However in this table, additional rows 1522, 1524 and 1526 have entries as a result of the addition of CS5 and changed for the delivery. With regard to row 1522, the entry lists for the stream of Stream 1 and concept of foo the version of 5 is noted as a current version and a previous version is identified as VM3, which is listed earlier in the table. With regard to row 1524, the entry lists for the stream of Stream 1 and concept of bar the version of 5 is noted as a current version and a previous version is identified as VM4, which is also listed previously in the table. With regard to row 1526, the entry lists for the stream of Stream 1 and concept of baz the version of 1 is noted as a current version, has a creation time of <time stamp 5>, associated with CS5 and has a previous version is identified as null, because there is no previous version.

Continuing with the example, the database transaction is committed and an asynchronous task is then put into a queue to be run some time later. The purpose of the task is to calculate dependencies of the new CS5 604 created previously. The asynchronous task follows a sequence of:

a) Either the task can be initialized with the change sets which were just created, or the embodiment can query the Change Set table for all entries that have 'dependencies computed'=false. The query alternative can be used to support cases where a system crashes after a delivery, but before the dependencies could be calculated. In this way the data integrity is not lost.

b) For the set of change sets, find the referenced version mappings, which have previous mappings for the change set. Using the above example, the following query could be used: SELECT id from VersionMapping where changeSet=CS5 AND previousVersion IS NOT NULL.

c) For the referenced version mappings found look at the identified previous mapping. Using the above example, VM9 and VM10 would have been returned, and respective previous mappings are VM3 and VM4 respectively.

d) For the previous mapping extract the associated change sets. Again using the above example, VM3 and VM4 both specify CS2 as the associated 'change set.' e) In a single transaction, update the dependents column of CS5 in the change set table, and update the dependencies computed flag to true.

On completion of the asynchronous task updating the change set dependencies, the change set table entry for CS5 604 would now look like ChangeSet table 1600 as shown in FIG. 16. The heading row of change set table 1600 comprises ID 1602, State 1604, Name 1606, Parent Stream 1608, Dependents 1610, Merged from 1612, Creation time 1614, Creator 1616 and Dependencies computed 1618. Row 1620 indicates, among the various entries, for ID of CS5 604, the status is still Committed 1622. Dependents now indicate a value of CS2 1624 whereas an empty indication was provided previously. Dependencies computed is now set to true 1626 rather than false as before.

Another asynchronous task is put into the queue to be run at some later time. The purpose of this task is to update the DeliveredChange table to indicate that a logical change set has been delivered into a particular stream. The asynchronous task now follows a sequence of:

a) For the given delivery session, identify all the change sets being delivered (e.g. CS3 508, CS4 510)

b) Recursively follow the back pointers from CS3 508 and CS4 510 if there are any (if CS3 508 had been delivered from some other stream, find out which change set that is, as that will also be considered logically delivered into the target stream—Stream 1).

c) Reduce the set of change sets identified by removing all change sets that are already considered to be logically in the target stream, stream 1. This set can be calculated by querying the DeliveredChanges table using a query such as: SELECT changeSet FROM DeliveredChanges where targetStream=Stream 1 AND changeSet IN (CS3, CS4). If the result set returned values, then remove those entries from the set created previously.

d) Start a database transaction e) Insert those change sets in the reduced set of changes into the DeliveredChanges table. The updated DeliveredChanges table would appear as DeliveredChanges table 1700 of FIG. 17. DeliveredChanges table 1700 looks like DeliveredChanges table 1100 as shown in FIG. 11. The heading row of DeliveredChanges table 1700 comprises the same entries as that of DeliveredChanges table 1100 now shown as Creation Time 1702, Target Stream 1704 and Change Set 1706. However in this case rows 1726 and 1728 have updated information associated with change sets of CS3 508 and CS4 510 respectively. In particular row 1726 indicates a <timestamp 5> 1714, a target stream of Stream 1 1716, and a change set of CS3 1718. Row 1728 indicates a <timestamp 5> 1720, a target stream of Stream 1 1722, and a change set of CS4 1724.

f) If the target change set CS5 604 contains the same final versions as those identified from the source stream (i.e. foo4, bar4, and baz1) then a CS5 604 entry would be created in the delivered change table to denote that it is logically in Stream 2 already, and should not be considered as a candidate change set for delivery back into Stream 2.

g) Otherwise if the target change set CS5 604 does not contain the same versions as existed in the source stream, then CS5 604 is not added into the delivered change table, because the new versions of the foo and bar artifacts may want to be merged back into Stream 2. In the current example, CS5 604 contains different versions and therefore it is undesirable to create any entry for CS5 604 against Stream 2 in the delivered change table.

h) Commit the database transaction. At this point CS5 604 has been delivered into the embodiment. The expensive behavior of updating the DeliveredChange table and calculating change set dependencies has been extracted to asynchronous tasks to allow the delivery process, the user experiences, to complete quickly. The core behavior has been identified to run in specific transactions to ensure data integrity. In the case of system crashes, the asynchronous task of updating the DeliveredChange table is required before any delivery, which will block the user and force the update to occur, this task is also dependent on the change set dependencies being up to date; therefore the system is guaranteed to be in a good state before the next delivery actually occurs. Alternatively, the system can invoke jobs at startup to schedule reschedule these asynchronous tasks to avoid blocking the user when the gesture to deliver is received.

Figure 18:
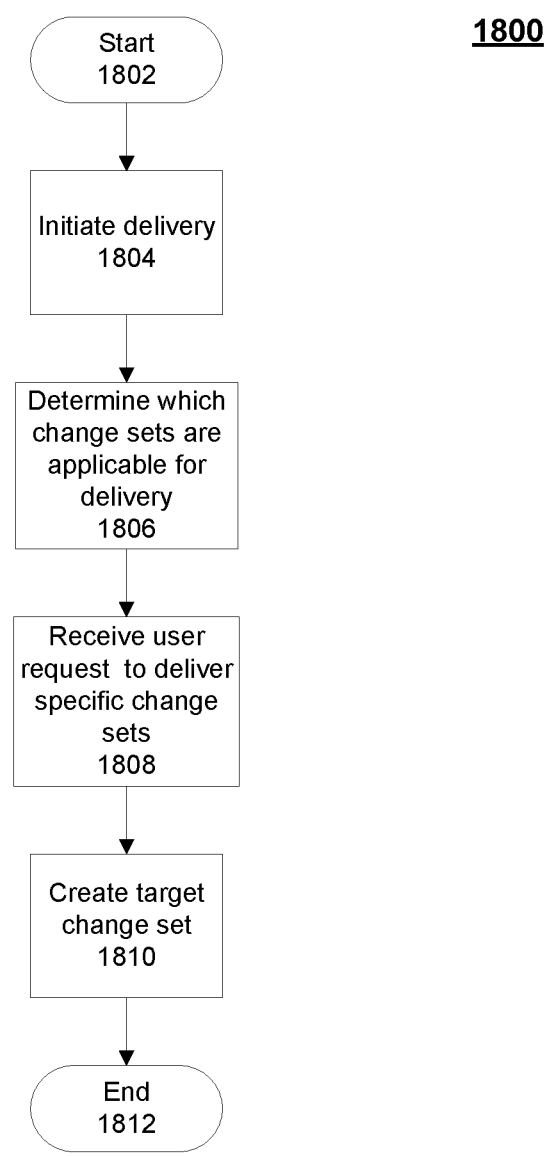
FIG. 18 is a flowchart of a delivery process in accordance with one embodiment of the disclosure.

With reference to FIG. 18, an example of a delivery process in accordance with one embodiment of the disclosure is presented. Process 1800 begins (step 1802) and initiates delivery (step 1804). The initiation may be due to a request by an entity in some form including a user or a result of the use of an automated configuration tool.

Process 1800 determines which change sets are applicable for delivery (step 1806). Which change sets are applicable simply means only those change sets which are required to be delivered and excludes change sets which may represent duplicates if delivered in place of changes which have been delivered.

Having determined which change sets are applicable for delivery, (step 1806) process 1800 receives a user request to deliver specific change sets (step 1808). How the user determines which of the change sets determined to be applicable for delivery are specified is out of the scope of this disclosure. An assumption is made that the user makes a request to deliver the specific change sets as chosen by the user.

Process 1800 creates a target change set (step 1810) and terminates thereafter step (1812).

Figure 19:
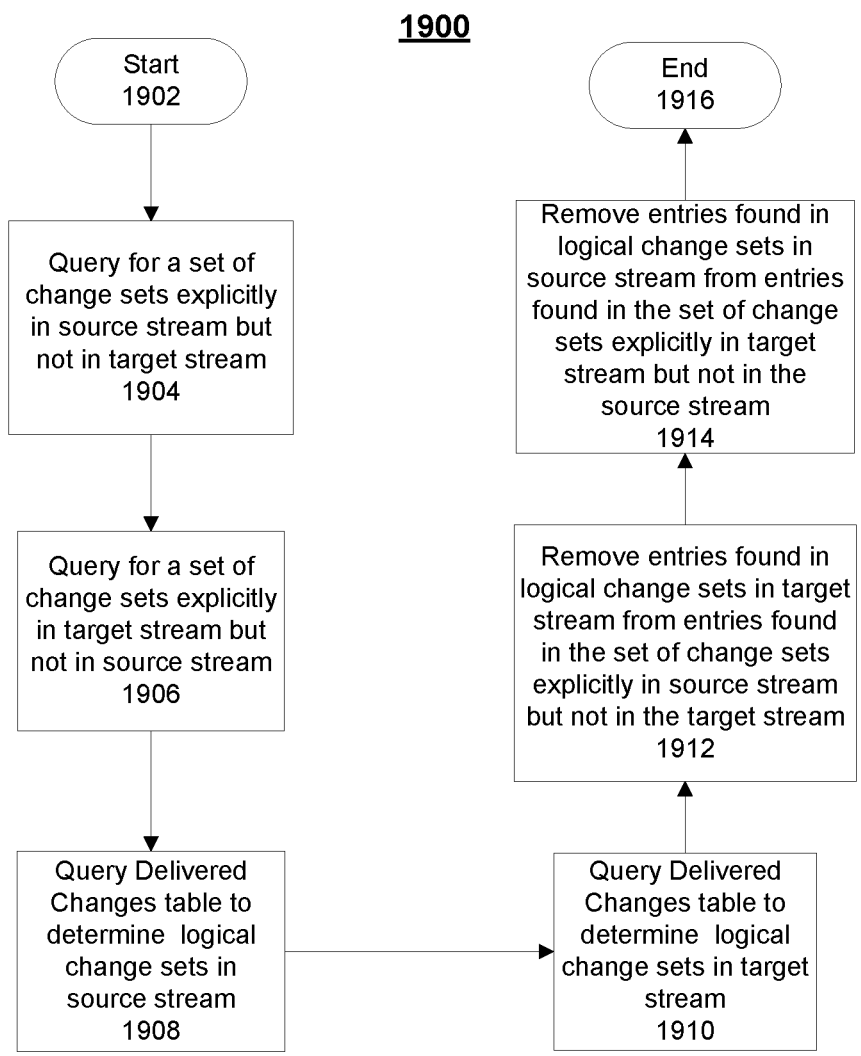
FIG. 19 is a flowchart of a process for determining change sets applicable for delivery in accordance with one embodiment of the disclosure.

With reference to FIG. 19 an example of a process for determining change sets applicable for delivery in accordance with one embodiment of the disclosure is presented. Process 1900 begins (step 1902) and queries for a set of change sets explicitly in a source stream but not in a target stream (step 1904). Process 1900 also queries for a set of change sets explicitly in the target stream but not in the source stream (step 1906).

Process 1900 queries a delivered changes table to determine logical change sets in the source stream (step 1908). Process 1900 also queries the delivered changes table to determine logical change sets in the target stream (step 1910).

Process 1900 removes entries found in logical change sets in the target stream from entries found in the set of change sets explicitly in the source stream but not in the target stream (step 1912). Process 1900 removes entries found in logical change sets in the source stream from entries found in the set of change sets explicitly in the target stream but not in the source stream (step 1914) and terminates thereafter (step 1916).

Figure 20:
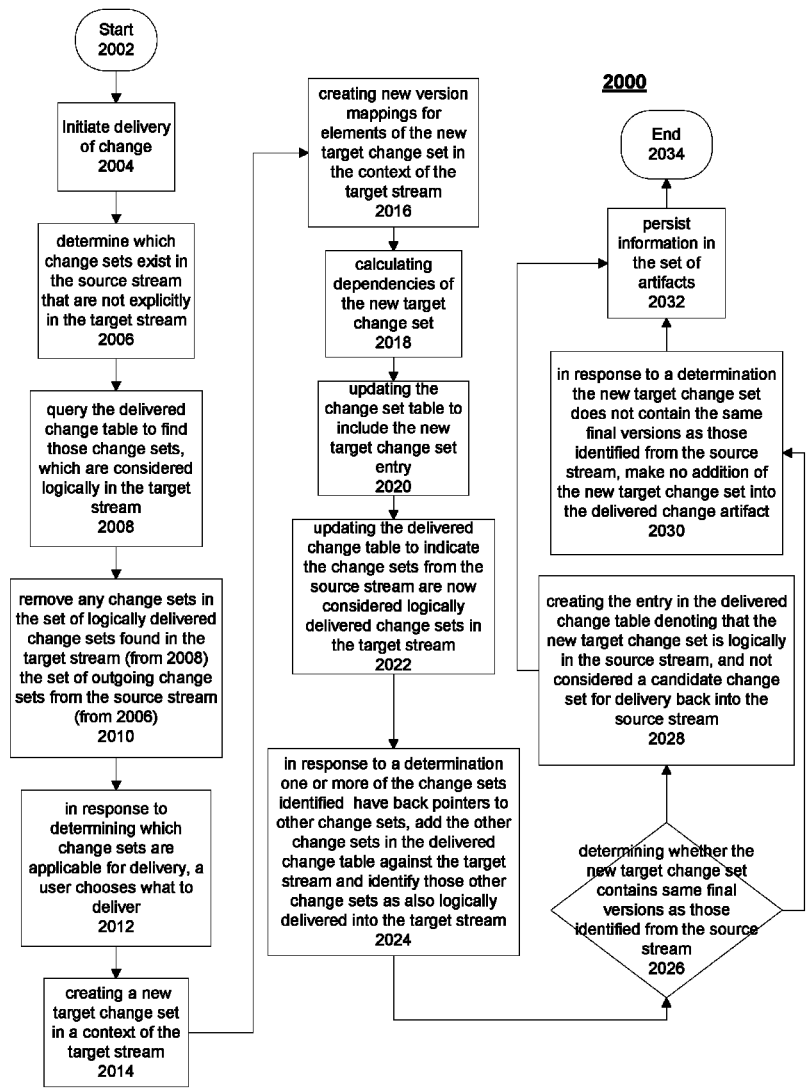
FIG. 20 is a flowchart of a process change set management of enhanced configuration management system of FIG. 3 in accordance with one embodiment of the disclosure.

With reference to FIG. 20 a process of managing change sets using the enhanced configuration management system 300 of FIG. 3 is presented. Process 2000 is an example of a process for managing change sets in configuration management system 300 of FIG. 3. Managing change sets occurs using a set of artifacts in a delivery and change management system comprising a stream artifact, including a unique identifier of a configuration and an identifier of a user who created the stream; a change set artifact, including a unique identifier of a change set and a reference to a stream in which the change set was created; a version mapping artifact, including a unique identifier of a version mapping and an identifier of a user who created the version mapping; a delivered change artifact, wherein the delivered change artifact tracks logically delivered change sets.

Process 2000 begins (step 2002) and in response to initiation of a delivery of change sets (step 2004) determines which of the change sets are available for delivery by determining which change sets exist in the source stream that are not explicitly in the target stream (step 2006). A completion of all asynchronous tasks pending for updating the delivered change artifact and change set dependencies, is forced for a source stream and a target stream. The process can be implemented without doing these tasks asynchronously. However use asynchronous tasks to provide the intensive processing (and provide ways to ensure the tasks complete in the event of failure) provides a more effective implementation of an embodiment.

Process 2000 queries delivered change table to find those change sets, which are considered logically in the target stream. (step 2008). The query of the delivered change table against the target stream is performed to determine the set of logical change sets, which exist, and therefore can be removed from what was found in previous step 2006.

Process 2000 removes any change sets in set of logically delivered change sets found in the target stream (from 2008) from the set of outgoing change sets from the source stream (2006), and repeats for the set of incoming change sets identified in the target stream, which refines the sets of change sets representing what can be delivered from stream 1 to stream 2, or accepted from stream 2 to stream 1 (step 2010). Note that Change sets are not removed from the source stream, but rather from the calculated set of outgoing change sets identified in step 2006. Therefore in this step all values found in step 2008 are removed from the set created in step 2006.

A local change set is one that is created by a user as a result of one of creating or modifying resources in a stream and the local change set has no back pointers. The target change set is one that is created as a result of delivering one or more change sets from one stream to another stream. The target change set has back pointers to the change sets in the source stream whose delivery resulted in creation of a respective target change set.

In response to determining which change sets are applicable for delivery in step 2010, a user chooses what to deliver (step 2012). How the user makes the determination is not discussed in this disclosure, but it there is an assumption that the user chooses what will be delivered.

The following steps represent persisting change set logic. Process 2000 creates a new target change set in a context of the target stream (step 2014). The new change set is given an ID and the change set table is updated with information for the new target change set.

Process 2000 creates new version mappings for elements of the new target change set in the context of the target stream (step 2016). The current version mappings of the elements are no longer current, and set as previous version mappings for the new version mappings needed in the new change set. The version mapping table is updated with the new version mappings. The source stream is not touched during delivery to a target stream.

Process 2000 calculates dependencies of the new target change set (step 2018). Process 2000 updates the change set table to include the new target change set entry (step 2020). Process 2000 updates the delivered change table to indicate the change sets CS3 508 and CS4 510 from the source stream are now considered logically delivered change sets in the target stream (step 2022). In response to a determination one or more of the change sets identified have back pointers to other change sets, process 2000 adds the other change sets in the delivered change table against the target stream and identifies those other change sets as also logically delivered into the target stream (step 2024).

Process 2000 determines whether the new target change set contains the same final versions in the target stream as those identified from the source stream (step 2026).

In response to a determination the new target change set contains same final versions in the target stream as those identified from the source stream, process 2000 creates the entry in the delivered change table denoting that the new target change set is logically in the source stream, and not considered a candidate change set for delivery back into the source stream (step 2028).

In response to a determination the new target change set does not contain the same final versions as those identified from the source stream, process 2000 makes no addition of the new target change set with the source stream into the delivered change table (step 2030). In step 2030 (different versions) a delivered change entry representing the target change set in the context of the source stream is not being created. Process 2000 persists information in the set of artifacts (step 2032) terminating thereafter (step 2034).

Embodiments described herein store data indicative that a delivery or merge occurred such that a system is able to provide enough audit history to enable one to address issues after the merge occurs and understand what exactly happened when a merge goes wrong. Further embodiments address how to store the data describing the delivery to enable historical cross-stream audit traceability.

Thus is disclosed in an illustrative embodiment, a computer-implemented process for managing change sets in a configuration management system. The computer-implemented process comprises initiating a delivery of the change sets and determining which of the change sets are applicable for delivery. The computer-implemented process further receives a request to deliver specific change sets of the change sets applicable for delivery, from a user and in response to receiving the request, creates a target change for delivery.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing change sets in a configuration management system, the computer-implemented method comprising: initiating a delivery of the change sets; determining which of the change sets are applicable for delivery, the determining comprising querying a delivered change artifact to find the applicable change sets for delivery, wherein a completion of tasks pending for updating the delivered change artifact and change set dependencies is forced for a source stream and a target stream; receiving a request to deliver specific change sets of the change sets applicable for delivery, from a user; in response to receiving the request, creating a target change set for delivery; determining whether a new target change set contains same final versions as those identified from the source stream; in response to a determination that the new target change set contains same final versions as those identified from the source stream, creating an entry in the delivered change artifact denoting that the new target change set is logically in the source stream, and not considered a candidate change set for delivery back into the source stream; in response to a determination the new target change set does not contain the same final versions as those identified from the source stream, making no addition of the new target change set into the delivered change artifact; and persisting information in a set of artifacts.

2. The computer-implemented method of claim 1 further comprising: querying the delivered change artifact to determine which change sets exist in the source stream that are not explicitly in the target stream; querying the delivered change artifact to determine which change sets exist are considered logically in the target stream; removing any change sets in a set of logically delivered change sets found in the target stream, from a set of outgoing change sets found in the source stream; creating the new target change set in a context of the target stream; creating new version mappings for elements of the new target change set in a context of the target stream, wherein current version mappings of the elements are no longer current, and set as previous version mappings for the new version mappings needed in the new change set, and wherein a version mapping artifact is updated with the new version mappings; calculating dependencies of the new target change set; updating a change set artifact to include an entry for the new target change set; updating the delivered change artifact to indicate the change sets from the source stream are now considered logically delivered change sets in the target stream; and in response to a determination one or more of the change sets identified have back pointers to other change sets, adding the other change sets in the delivered change artifact against the target stream and identifying those other change sets as logically delivered into the target stream.

3. The computer-implemented method of claim 2 wherein creating the new target change set in the context of the target stream further comprises giving the new change target stream ID and updating the change set artifact with information for the new target change set.

4. The computer-implemented method of claim 1 wherein the completion of tasks pending for updating the delivered change artifact and change set dependencies, is forced for the source stream and the target stream further comprises completing all asynchronous tasks pending.

5. The computer-implemented method of claim 1 wherein the configuration management system further comprises: a set of artifacts in a delivery and change management system comprising a stream artifact, including a unique identifier of a configuration and an identifier of a user who created the stream; wherein a change set artifact, includes a unique identifier of a change set and a reference to a stream in which the change set was created; wherein a version mapping artifact, includes a unique identifier of a version mapping and an identifier of a user who created the version mapping; and wherein a delivered change artifact, tracks logically delivered change sets.

6. The computer-implemented method of claim 1 wherein a local change set is one that is created by a user as a result of one of creating or modifying resources in a stream and the local change set has no back pointers, and wherein the target change set is one that is created as a result of delivering one or more change sets from one stream to another stream.

7. A computer program product for managing change sets in a configuration management system, comprising a computer readable storage medium having program instructions embodied therewith, the program instructions executable by a processor unit to cause the processor unit to perform a method comprising: initiating a delivery of the change sets; determining which of the change sets are applicable for delivery, the determining comprising querying a delivered change artifact to find the applicable change sets for delivery, wherein a completion of tasks pending for updating the delivered change artifact and change set dependencies is forced for a source stream and a target stream; receiving a request to deliver specific change sets of the change sets applicable for delivery, from a user; in response to receiving the request, creating a target change set for delivery; and in response to a determination one or more of the change sets have back pointers to other change sets, adding the other change sets in the delivered change artifact against the target stream and identifying those other change sets as logically delivered into the target stream.

8. The computer program product of claim 7 wherein the processor unit further executes the program instructions to cause the processor unit to perform the method further comprising: querying the delivered change artifact to determine which change sets exist in the source stream that are not explicitly in the target stream; querying the delivered change artifact to determining which change sets exist are considered logically in the target stream; removing any change sets in a set of logically delivered change sets found in the target stream, from a set of outgoing change sets found in the source stream; creating a new target change set in a context of the target stream; creating new version mappings for elements of the new target change set in a context of the target stream, wherein current version mappings of the elements are no longer current, and set as previous version mappings for the new version mappings needed in the new change set, and wherein a version mapping artifact is updated with the new version mappings; calculating dependencies of the new target change set; updating a change set artifact to include an entry for the new target change set; updating the delivered change artifact to indicate the change sets from the source stream are now considered logically delivered change sets in the target stream; determining whether the new target change set contains same final versions as those identified from the source stream; in response to a determination the new target change set contains same final versions as those identified from the source stream, creating an entry in the delivered change artifact denoting that the new target change set is logically in the source stream, and not considered a candidate change set for delivery back into the source stream; in response to a determination the new target change set does not contain the same final versions as those identified from the source stream, making no addition of the new target change set into the delivered change artifact; and persisting information in a set of artifacts.

9. The computer program product of claim 8 wherein creating the new target change set in the context of the target stream further comprises giving the new target change stream ID and updating the change set artifact with information for the new target change set.

10. The computer program product of claim 7 wherein the completion of tasks pending for updating the delivered change artifact and change set dependencies, is forced for the source stream and the target stream further comprises completing all asynchronous tasks pending.

11. The computer program product of claim 7 wherein the configuration management system further comprises: a set of artifacts in a delivery and change management system comprising a stream artifact, including a unique identifier of a configuration and an identifier of a user who created the stream; wherein a change set artifact, includes a unique identifier of a change set and a reference to a stream in which the change set was created; wherein a version mapping artifact, includes a unique identifier of a version mapping and an identifier of a user who created the version mapping; and wherein a delivered change artifact, tracks logically delivered change sets.

12. The computer program product of claim 7 wherein a local change set is one that is created by a user as a result of one of creating or modifying resources in a stream and the local change set has no back pointers, and wherein the target change set is one that is created as a result of delivering one or more change sets from one stream to another stream.

13. An apparatus for managing change sets in a configuration management system, the apparatus comprising: a communications fabric; a memory connected to the communications fabric, wherein the memory contains computer executable program code; a communications unit connected to the communications fabric; an input/output unit connected to the communications fabric; a display connected to the communications fabric; and a processor unit connected to the communications fabric, wherein the processor unit executes the computer executable program code to direct the apparatus to: initiate a delivery of the change sets; determine which of the change sets are applicable for delivery, the determining comprising querying a delivered change artifact to find the applicable change sets for delivery, wherein a completion of tasks pending for updating the delivered change artifact and change set dependencies is forced for a source stream and a target stream; receive a request to deliver specific change sets of the change sets applicable for delivery, from a user; in response to receiving the request, create a target change set for delivery; query the delivered change artifact to determine which change sets exist in the source stream that are not explicitly in the target stream; query the delivered change artifact to determine which change sets exist are considered logically in the target stream; remove any change sets in a set of logically delivered change sets found in the target stream, from a set of outgoing change sets found in the source stream; create a new target change set in a context of the target stream; create new version mappings for elements of the new target change set in a context of the target stream, wherein current version mappings of the elements are no longer current, and set as previous version mappings for the new version mappings needed in the new change set, and wherein a version mapping artifact is updated with the new version mappings; calculate dependencies of the new target change set; update a change set artifact to include an entry for the new target change set; and update the delivered change artifact to indicate the change sets from the source stream are now considered logically delivered change sets in the target stream.

14. The apparatus of claim 13 wherein the processor unit executes the computer executable program code to further direct the apparatus to: in response to a determination one or more of the change sets identified have back pointers to other change sets, add the other change sets in the delivered change artifact against the target stream and identifying those other change sets as logically delivered into the target stream; determine whether the new target change set contains same final versions as those identified from the source stream; in response to a determination the new target change set contains same final versions as those identified from the source stream, create an entry in the delivered change artifact denoting that the new target change set is logically in the source stream, and not considered a candidate change set for delivery back into the source stream; in response to a determination the new target change set does not contain the same final versions as those identified from the source stream, make no addition of the new target change set into the delivered change artifact; and persist information in a set of artifacts.

15. The apparatus of claim 13 wherein the completion of tasks pending for updating the delivered change artifact and change set dependencies is forced for the source stream and the target stream further comprises completing all asynchronous tasks pending.

16. The apparatus of claim 13 wherein the configuration management system further comprises: a set of artifacts in a delivery and change management system comprising a stream artifact, including a unique identifier of a configuration and an identifier of a user who created the stream; wherein a change set artifact, includes a unique identifier of a change set and a reference to a stream in which the change set was created; wherein a version mapping artifact, includes a unique identifier of a version mapping and an identifier of a user who created the version mapping; and wherein a delivered change artifact, tracks logically delivered change sets.

17. The apparatus of claim 13 wherein a local change set is one that is created by a user as a result of one of creating or modifying resources in a stream and the local change set has no back pointers, and wherein the target change set is one that is created as a result of delivering one or more change sets from one stream to another stream.

* * * * *